March 17, 1953          P. E. VOLZ          2,632,053
INTEGRATING TELEGRAPH SIGNAL DETECTOR
Filed July 27, 1949
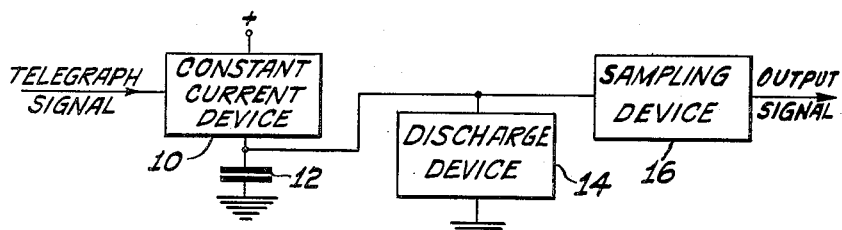
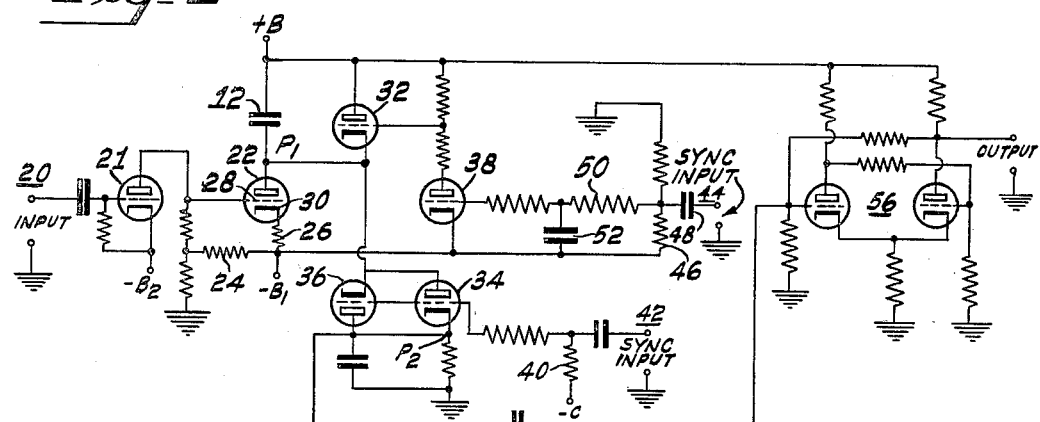
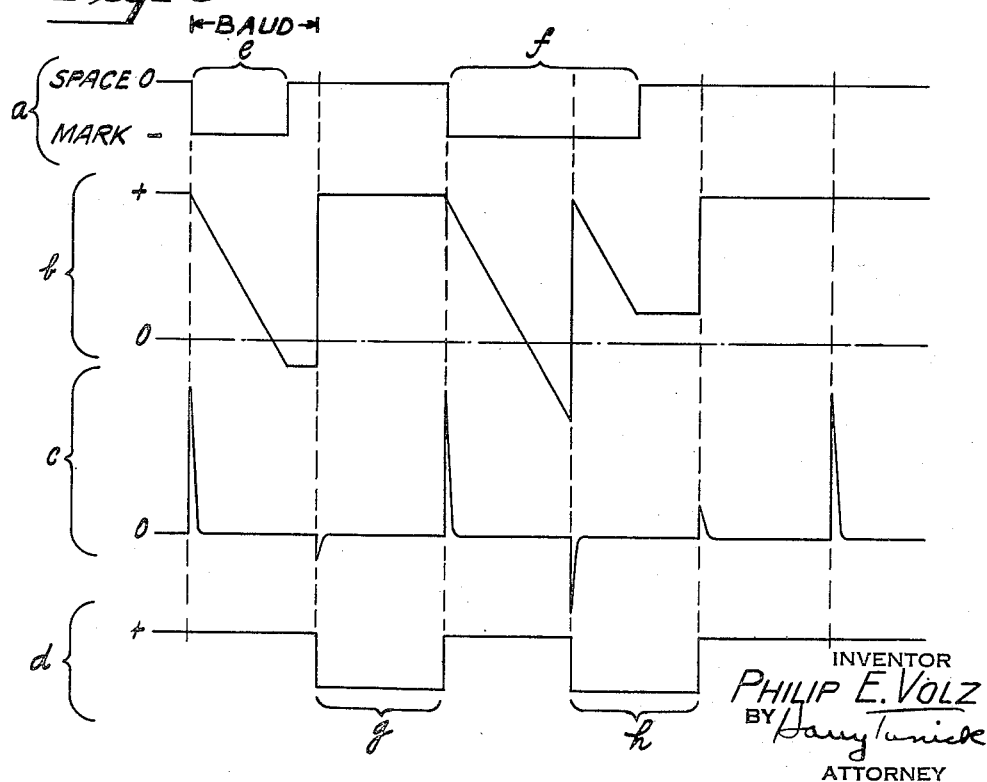
INVENTOR
PHILIP E. VOLZ
BY Harry Tunick
ATTORNEY Patented Mar. 17, 1953

2,632,053

UNITED STATES PATENT OFFICE 2,632,053

INTEGRATING TELEGRAPH SIGNAL DETECTOR

Philip Eckert Volz, Florham Park, N. J., assignor to Radio Corporation of America, a corporation of Delaware Application July 27, 1949, Serial No. 107,017

15 Claims. (Cl. 178—70)

The invention relates to telegraphy and it particularly pertains to circuit arrangements for detecting mark-space telegraph signals by integrating the signal amplitude versus time over each signal element.

Previously known methods of detecting a telegraph signal are based on sampling each signal element for a period of time which is short compared to the duration of a signal element. One highly undesirable characteristic of any detection method which samples the signal for short periods is that a narrow gap occurring in a mark element, or a narrow pulse of noise occurring in a space element, if coincident with the sampling period will cause the element to be interpreted incorrectly. The same narrow gaps or noise pulses will not result in erroneous interpretations in an integrating detection system, and hence such a system is preferable to a sampling detection system.

Electromechanical and electronic methods of integrating detection have been suggested by others in the form of means to charge a capacitor through a constant current device to perform the integration. However, the suggested circuits call for charging the capacitor in one direction when the signal is marking and in the opposite direction when the signal is spacing; which in light of the present invention is actually an unnecessary complication.

Furthermore, these prior art arrangements make no mention of the weight which a telegraph signal may have and still be read correctly. The weight of a telegraph signal, as known to those skilled in the art, is the ratio of the duration of an actual mark to the duration of two perfect signal elements expressed as a percentage. For example, with a perfect signal the duration of an actual mark is exactly one signal element, and the ratio of actual mark duration to the duration of two signal elements is 0.5; or expressed as a percentage, is 50 per cent. This is usually written without the per cent signs shown and with the mark weight percentage written first, followed by the space weight percentage. For the perfect signal this would be written as 50-50 weight.

It is an object of the invention to provide an integrating circuit arrangement for detecting received telegraph signals.

It is another object of the invention to provide an arrangement capable of detecting telegraph signals having a weight greater than 75-25.

It is a further object of the invention to provide an integrating detector for mark-space telegraphic signals which is simple and economical in construction.

It is a supplementary object of the invention to provide an integrating type of detector which is readily and simply adjustable in operation.

It is yet a further object of the invention to provide a detecting arrangement which will be unaffected by gaps or noise pulses occurring in the mark or space signal respectively.

It is an additional object of the invention to provide an arrangement whereby received telegraph signals are interpreted in terms of signal amplitude and time interval for each element of the signal.

These and other objects which will appear as the specification progresses are attained according to the invention by means of a constant current device switched on and off in response to received telegraph signals, the output current flowing into a capacitor to produce a potential proportional to the integral of the amplitude over the time interval of the signal element, which potential is measured at the end of each signal element and there interpreted as mark or space, whereupon the capacitor is discharged in readiness for the succeeding signal element.

The invention will be described in detail with reference to the accompanying drawing forming part of the specification and in which:

Fig. 1 is a block diagram illustrating the underlying principles of the invention;

Fig. 2 is a schematic diagram of a preferred embodiment of a detector circuit according to the invention; and Fig. 3 is a diagram representing the waveforms produced in the circuit arrangement of Fig. 2.

Referring to the block diagram of Fig. 1, there is shown a constant current device 10, a capacitor 12, a sampling device 16, and a discharge device 14 interconnected so that capacitor 12 is charged by means of constant current device 10 and discharged by a discharge device 14 after the charge has been determined quantitatively by sampling device 16. For the purpose of this description it is assumed that when the input telegraph signal is spacing no current flows into capacitor 12, and that when the signal is marking a constant current flows into capacitor 12 although it is clearly within the scope of the invention to provide an arrangement functioning in exactly the opposite sense. At the end of the integrating period the sampling device 14 is caused to measure the potential then existing across capacitor 12 and if this voltage exceeds a predetermined value the sample or output signal will be a pulse of given polarity; while if the potential existing across capacitor 12 is less than the predetermined value the output signal is a pulse of opposite polarity. The polarity of the output signal thus indicates the prevailing nature of the integrated signal element, that is, whether it was mark or space. The portion of a signal element which must be mark in order to indicate mark depends upon the predetermined potential value established as a reference. Thus the weight of the telegraph signal which the detector will correctly interpret is a function of this reference potential.

The advantageous operation of the basic arrangement will become apparent from a discussion based on the response to a typical signal element where the received mark element is shorter than a full signal element. If the potential $e_c$ existing across capacitor 12 at the sampling a mark element, while if it is equal to or less than another value $e_s$, which is less than $e_m$, the device will indicate a space element. The actual time for integration is:

$$t_i = t_m - (t \pm \Delta t)$$

where $t_m$ is the actual mark time, while the time $t_b$ is the duration of one signal element. The time $t$ is the time consumed in reading the previous signal element and in discharging the capacitor, and also includes a factor to allow for misalignment of the local switching with the incoming signal. The maximum variation in $t$ due to all tolerances is $\Delta t$.

The time for integration of a full mark with $\Delta t = 0$ is: $t_b - t$ assuming the capacitor potential for a full mark to be $e'$ and for $\Delta t = 0$, the relative capacitor potential for any mark length becomes, $$\frac{e_c}{e'} = \frac{t_m - (t \pm \Delta t)}{t_b - t}$$

for mark indication $$\frac{e_c}{e'} \geq \frac{e_m}{e'}$$

and for space indication $$\frac{e_c}{e'} \leq \frac{e_s}{e'}$$

Failure (faulty interpretation) due to light mark occurs due to the mark-derived potential failing to attain a value sufficient to trip the mark indication portion of the device. The sign of $\Delta t$ is taken to require the largest value of actual mark time $t_m$, since the error $\Delta t$ may be in either direction; this yields at the light weight failure point:

$$\frac{t_m}{t_b} = \frac{e_r}{e'}\left(1 - \frac{t}{t_b}\right) + \left(\frac{t + \Delta t}{t_b}\right)$$

By similar reasoning and since a heavy mark consists of one full signal element of mark plus an element which is partially mark, the heavy weight failure point is:

$$\frac{t_m}{t_b} = 1 + \frac{e_s}{e'}\left(1 - \frac{t}{t_b}\right) + \left(\frac{t - \Delta t}{t_b}\right)$$

It is evident that the signal weight limits which can be detected may be set by the choice of $e_m$ and $e_s$. Under ideal conditions $e_m = e_s$; $t = 0$; and $\Delta t = 0$; that is, the sampling device 16 has no indeterminate range, and no time is consumed in sampling or discharging capacitor 12. Substitution of these values in the equations shows that $$\frac{t_m}{t_b} \text{ (heavy)} - \frac{t_m}{t_b} \text{ (light)} = 1$$

for any value of $$\frac{e_m}{e'}$$

chosen, although the absolute value of $$\frac{t_m}{t_b}$$

varies with $$\frac{e_m}{e'}$$

This means that the difference between the maximum length mark and the minimum length is one signal element. In terms of signal weight the difference between the maximum and minimum weight is 50 per cent. In practice due to the finite indeterminate range of the sampling device, and the sampling and discharge times, the actual range in signal weight which may be read correctly will be somewhat less than the theoretical maximum of 50 per cent.

The preferred embodiment of a circuit to perform integrating mark space detection according to the invention is shown in Fig. 2. A keyed D.-C. telegraph signal is applied to a pair of input terminals 20. For the purpose of explanation it will be assumed that the input signal is negative for marking elements and zero for spacing elements, but it should be understood that it is within the scope of the invention to correctly detect any type of telegraphic signals by providing the proper conversion to establish a signal wave of two conditions in manner known to those skilled in the art and applying that wave to other well-known circuits to achieve the input signal herein described. The input signal is amplified by the portion of the circuit including vacuum tube 21 and the values of the applied operating voltages are such that when the signal corresponds to a space element tube 22 is blocked, and when the signal corresponds to mark element tube 22 is conducting. Tube 22 is a constant current generator since on mark elements the voltage across resistor 24 acts as a constant reference voltage, and due to the large amount of degeneration present, the voltage across resistor 26 is maintained nearly equal to the voltage across resistor 24, practically independent of the anode voltage on tube 22 and the characteristics thereof. Since the grid 28 of tube 22 is always negative with respect to cathode 30, a constant voltage across resistor 26 also means a constant anode current in tube 22. The anode current of tube 22 charges a capacitor 12, and on mark signal elements potential across capacitor 12 increases linearly with time. During the signal elements tubes 32, 34, 36 are all blocked. Tube 32 is held in blocked condition due to grid bias applied by tube 38 which is normally conducting. Tubes 34 and 36 are normally held in blocked condition due to the bias voltage applied to the grids thereof via resistor 40.

At the end of each signal element, local synchronous voltage sources (not shown, but which are two square waves 180° out of phase having periods equal to the baud duration) apply a positive transition to terminals 42 and a negative transition to terminals 44. This conditions both tubes 34 and 36 to conduct; the particular tube which will conduct depends upon the potential across capacitor 12. At the end of a mark element the voltage at point $P_1$ is negative with respect to ground and tube 36 will conduct, while at the end of a space element the voltage at point $P_1$ is positive with respect to ground and tube 34 will conduct. This results in obtaining a negative pulse at point P₂ for a mark element, and a positive pulse for a space element. For purposes of illustration only, a signal regenerator in the form of a bi-stable multivibrator or trigger circuit 56 is shown between the sampling device and the output terminals. The negative transition applied to terminals 44 is differentiated by the circuit comprising resistor 46 and a capacitor 48. The negative pulse so formed is shaped to delay it by the circuit comprising a resistor 50 and a capacitor 52, and this pulse causes tube 38 to be blocked for a short period immediately following the sampling. During this period capacitor 12 is discharged through tube 32. After the discharge period the circuit is ready to integrate the next signal element.

The waveforms shown in Fig. 3 further illustrate the operation of the circuit. Shown at $a$ is the input telegraph signal, at $b$ the voltage on the anode of tube 22 with respect to ground, at $c$ the pulses resulting from the sampling, and at $d$ the output of the signal regenerator. The input signal has been purposely shown as distorted to show the effects of light and heavy marks. The input signal contains one light mark at $e$, and one heavy mark at $f$. It is seen that the regenerated output contains two perfect marks at $g$ and $h$.

While the invention has been described in terms of express embodiments, it is to be understood that obvious modifications thereof will be suggested to those skilled in the art without departing from the spirit and scope of the invention.

I claim:

1. A circuit arrangement for detecting telegraph signals transmitted as a train of individual signal elements of different nature, including an electron discharge device constituting a controllable electron path, means to apply said signal elements to said electron discharge device to render the same conducting when said elements are of one nature and to block the same when said elements are of another nature, a charge storage device coupled in circuit with said electron discharge device to develop a charge varying proportionally to the integral of the amplitude over the duration of said elements of one nature, and a pair of controllable unilateral impedance devices coupled across said charge storage device to provide conduction in opposite directions, one of said unilateral impedance devices conducting when said elements are of said one nature and the other conducting when said elements are of said other nature to produce pulses of current having polarity indicative of the nature of said elements.

2. A circuit arrangement for detecting telegraph signals transmitted as a train of individual signal elements of different nature, including an electron discharge device defining a controllable electron path, means to apply said signal elements to said electron discharge device to render the same conducting when said elements are of one nature and to block the same when said elements are of another nature, a charge storage device coupled in circuit with said electron discharge device to develop a charge varying proportionally to the integral of the amplitude over the duration of said elements of one nature, a pair of controllable unilateral impedance devices coupled across said charge storage device to provide conduction in opposite directions, one of said unilateral impedance devices conducting when said elements are of said one nature and the other conducting when said elements are of said other nature to produce pulses of current having polarity indicative of the nature of said elements, and means to render said unilateral impedance devices and said discharge device operative at the termination of each of said signal elements.

3. A circuit arrangement for detecting telegraph signals transmitted as a train of individual signal elements of different nature, including an electron discharge device constituting a controllable electron path, means to apply said signal elements to said electron discharge device to render the same conducting when said elements are of one nature and to block the same when said elements are of another nature, a charge storage device coupled in circuit with said electron discharge device to develop a charge varying proportionally to the integral of the amplitude over the duration of said elements of one nature, a pair of controllable unilateral impedance devices coupled across said charge storage device to provide conduction in opposite directions, one of said unilateral impedance devices conducting when said elements are of said one nature and the other conducting when said elements are of said other nature to produce pulses of current having polarity indicative of the nature of said elements, and a signal regenerator coupled to said unilateral impedance devices to reproduce a train of signal elements in response to said pulses of current.

4. A circuit arrangement for detecting telegraph signals transmitted as a train of individual signal elements of different nature, including an electron discharge device constituting a controllable electron path, means to apply said signal elements to said electron discharge device to render the same conducting when said elements are of one nature and to block the same when said elements are of another nature, a charge storage device coupled in circuit with said electron discharge device to develop a charge varying proportionally to the integral of the amplitude over the duration of said elements of one nature, a pair of controllable unilateral impedance devices coupled across said charge storage device to provide conduction in opposite directions, one of said unilateral impedance devices conducting when said elements are of said one nature and the other conducting when said elements are of said other nature to produce pulses of current having polarity indicative of the nature of said elements, a controllable discharge device coupled across said charge storage device to discharge the same, and means to render said unilateral impedance devices and said discharge device operative at the termination of each of said signal elements.

5. A circuit arrangement for detecting telegraph signals transmitted as a train of individual signal elements of different nature, including an electron discharge device having electrodes defining a controllable electron path, means to apply said signal elements to at least one of said electrodes to render the electron discharge device conducting when said elements are of one nature and to block the same when said elements are of another nature, a charge storage device coupled in circuit with said electron discharge device to develop a charge varying proportionally to the integral of the amplitude over the duration of said elements of one nature, a pair of controllable unilateral impedance devices coupled across said charge storage device to provide conduction in opposite directions, one of said unilateral impedance devices conducting when said elements are of said one nature and the other conducting when said elements are of said other nature to produce pulses of current having polarity indicative of the nature of said elements, a signal regenerator coupled to said unilateral impedance devices to reproduce a train of signal elements in response to said pulses of current, a controllable discharge device coupled across said charge storage device to discharge the same, and means to render said unilateral impedance devices and said discharge device operative at the termination of each of said signal elements, said means including a delay circuit arranged to render said discharge device operative only after said unilateral impedance devices have functioned.

6. A circuit arrangement for detecting telegraph signals transmitted as a train of individual signal elements of different nature, including an electron discharge device, means to apply said signal elements to said electron discharge device to render the same conducting when said elements are of one nature and to block the same when said elements are of another nature, a capacitor coupled in circuit with said electron discharge device to develop a charge varying proportionally to the integral of the amplitude over the duration of said elements of one nature, and a pair of grid controlled vacuum tubes coupled across said capacitor to provide conduction in opposite directions, one of said vacuum tubes conducting when said elements are of said one nature and the other conducting when said elements are of said other nature to produce pulses of current having polarity indicative of the nature of said elements.

7. A circuit arrangement for detecting telegraph signals transmitted as a train of individual signal elements of different nature, including an electron discharge device, means to apply said signal elements to said electron discharge device to render the same conducting when said elements are of one nature and to block the same when said elements are of another nature, a capacitor coupled in circuit with said electron discharge device to develop a charge varying proportionally to the integral of the amplitude over the duration of said elements of one nature, a pair of grid controlled vacuum tubes coupled across said capacitor to provide conduction in opposite directions, one of said vacuum tubes conducting when said elements are of said one nature and the other conducting when said elements are of said other nature to produce pulses of current having polarity indicative of the nature of said elements, and a signal regenerator coupled to said vacuum tubes to reproduce a train of signal elements in response to said pulses of current.

8. A circuit arrangement for detecting telegraph signals transmitted as a train of individual signal elements of different nature, including an electron discharge device, means to apply said signal elements to said electron discharge device to render the same conducting when said elements are of one nature and to block the same when said elements are of another nature, a capacitor coupled in circuit with said electron discharge device to develop a charge varying proportionally to the integral of the amplitude over the duration of said elements of one nature, a pair of grid controlled vacuum tubes coupled across said capacitor to provide conduction in opposite directions, one of said vacuum tubes conducting when said elements are of said one nature and the other conducting when said elements are of said other nature to produce pulses of current having polarity indicative of the nature of said elements, and an electron discharge tube coupled across said capacitor to discharge the same.

9. A circuit arrangement for detecting telegraph signals transmitted as a train of individual signals elements of different nature, including an electron discharge device, means to apply said signal elements to said electron discharge device to render the same conducting when said elements are of one nature and to block the same when said elements are of another nature, a capacitor coupled in circuit with said electron discharge device to develop a charge varying proportionally to the integral of the amplitude over the duration of said elements of one nature, a pair of grid controlled vacuum tubes coupled across said capacitor to provide conduction in opposite directions, one of said vacuum tubes conducting when said elements are of said one nature and the other conducting when said elements are of said other nature to produce pulses of current having polarity indicative of the nature of said elements, an electron discharge tube coupled across said capacitor to discharge the same, and means to render said pair of grid controlled vacuum tubes and said electron discharge tube operative at the termination of each of said signal elements.

10. A circuit arrangement for detecting telegraph signals transmitted as a train of individual signal elements of different nature, including an electron discharge device, means to apply said signal elements to said electron discharge device to render the same conducting when said elements are of one nature and to block the same when said elements are of another nature, a capacitor coupled in circuit with said electron discharge device to develop a charge varying proportionally to the integral of the amplitude over the duration of said elements of one nature, a pair of grid controlled vacuum tubes coupled across said capacitor to provide conduction in opposite directions, one of said vacuum tubes conducting when said elements are of said one nature and the other conducting when said elements are of said other nature to produce pulses of current having polarity indicative of the nature of said elements, a signal regenerator coupled to said vacuum tubes to reproduce a train of signal elements in response to said pulses of current, an electron discharge tube coupled across said capacitor to discharge the same, and means to render said pair of grid controlled vacuum tubes and said electron discharge tube operative at the termination of each of said signal elements, said means including a delay circuit arranged to render said electron discharge tube operative only after said grid controlled vacuum tubes have functioned.

11. A circuit arrangement for detecting telegraph signals transmitted as a train of individual signal elements of different nature, including a first vacuum tube having a cathode, a control grid and an anode, an input circuit coupled between the grid and cathode of said first tube and adapted to apply said signals thereto, a capacitor coupled to the anode of said tube, a second vacuum tube having a cathode, a control grid and an anode, the cathode of said second tube being connected to the anode of said first tube and one terminal of said capacitor, the anode of said second tube being connected to the other terminal of said capacitor, a pair of vacuum tubes having parallel grids and anode-cathode interconnections, one of said anode-cathode interconnections being connected to said one terminal of said capacitor and the other to a shunt resistor-capacitor combination constituting an output load impedance, the grids of said pair of vacuum tubes being connected via differentiating circuitry to terminals to which a source of voltage synchronized with said signals is applied, a further vacuum tube having a cathode, a control grid and an anode, the cathode and anode of said further tube being connected to the grid circuit of said second vacuum tube and having the grid connected via differentiating circuitry to terminals to which a second source of voltage in anti-phase to said first source is applied, and a time delay network interposed between said further vacuum tube and the associated differentiating network, thereby, in sequence, to charge said capacitor to a potential indicative of the nature of the individual signal element under consideration, to connect said capacitor through one of the vacuum tubes of said pair at the end of the signal element under consideration to said output load impedance to develop a pulse therein of polarity indicative of said element under consideration, and to discharge said capacitor in readiness for the succeeding signal element.

12. A circuit arrangement for detecting telegraph signals transmitted as a train of individual signal elements of different nature, including an electron discharge device having electrodes defining a controllable electron path, means to apply said train of signal elements to said electron discharge device to render the same conducting when said signal elements are of one nature and to block the same when said signal elements are of another nature, a charge storing device coupled in circuit with said electron discharge device to develop a charge proportional to the integral of the amplitude of elemental portions of one nature over the duration of the signal element under consideration, a pair of unilateral impedance devices coupled to said charge storing device to provide conduction in opposite directions, and means to render said unilateral impedance devices operable to produce a resultant current pulse of polarity indicative of the prevailing nature of the signal element under consideration.

13. A circuit arrangement for detecting telegraph signals transmitted as a train of individual signal elements of different nature, including a bistable multivibrator circuit arranged for regenerating said train of signal elements, said signal regenerating circuit responding to pulses of one polarity to produce regenerated signal elements of one nature and to pulses of opposite polarity to produce regenerated signal elements of another nature, a constant current device, a charge storing device coupled in circuit with said constant current device, means to apply said train of signal elements to said constant current device to develop a charge proportional to the integral of the amplitude of elemental portions of one nature over the duration of the signal element under consideration, a pair of controllable unilateral impedance devices providing conduction in opposite directions and coupling said charge storing device to said multivibrator circuit, and means to render said unilateral impedance devices operable to produce a resultant current pulse of polarity indicative of the prevailing nature of the signal element under consideration and trigger said multivibrator circuit to produce a regenerated signal element of corresponding nature.

14. A circuit arrangement for detecting telegraph signals transmitted as a train of individual signal elements of different nature, including a signal regenerator circuit responsive to current pulses of opposite polarity to reproduce signal elements of opposite nature, a constant current generator having an input circuit and an output circuit, a charge storing device connected to the output circuit of said constant current generator, means to apply the signal element under consideration to the input circuit of said constant current generator to produce a substantially constant flow of current through said charge storing device for elemental portions of given nature and substantially zero current flow for elemental portions of opposite nature to develop a charge proportional to the elemental portions of said given nature integrated over the duration of said signal element under consideration, and a charge sampling device coupled between said charge storing device and said signal regenerator circuit to interpret the charge stored in said charge storing device and pass a current pulse of polarity indicative of the prevailing nature of said signal element under consideration to said signal regenerator circuit for actuating the same accordingly.

15. A circuit arrangement for detecting telegraph signals transmitted as a train of individual signal elements of different nature, including a signal regenerator circuit responsive to current pulses of opposite polarity to reproduce signal elements of opposite nature, a constant current generator having an input circuit and an output circuit, a charge storing device connected to the output circuit of said constant current generator, means to apply the signal element under consideration to the input circuit of said constant current generator to produce a substantially constant flow of current through said charge storing device for elemental portions of given nature and substantially zero current flow for elemental portions of opposite nature to develop a charge proportional to the elemental portions of said given nature integrated over the duration of said signal element under consideration, a charge sampling device coupled between said charge storing device and said signal regenerator circuit to interpret the charge stored in said charge storing device and pass a current pulse of polarity indicative of the prevailing nature of said signal element under consideration to said signal regenerator circuit for actuating the same accordingly, and a variable impedance device coupled across said charge storing device to discharge the latter in readiness for consideration of the succeeding signal element.

PHILIP ECKERT VOLZ.

REFERENCES CITED

The following references are of record in the file of this patent:

UNITED STATES PATENTS

| Number | Name | Date |
| --- | --- | --- |
| 1,689,263 | Vernam | Oct. 30, 1928 |
| 2,039,629 | Burton | May 5, 1936 |
| 2,470,722 | Rattner | May 17, 1949 |

FOREIGN PATENTS

| Number | Country | Date |
| --- | --- | --- |
| 271,155 | Great Britain | May 18, 1927 |